July 15, 1958        B. E. LUBOSHEZ        2,843,015
PRISM MAGNIFICATION SYSTEMS COMPRISING THREE OR MORE PRISMS
Filed Sept. 1, 1955        4 Sheets-Sheet 1

Benjamin E. Luboshez
INVENTOR.

BY Daniel I. Mayne
Harold F. Bennett
ATTORNEY & AGENT

July 15, 1958  B. E. LUBOSHEZ  2,843,015
PRISM MAGNIFICATION SYSTEMS COMPRISING THREE OR MORE PRISMS
Filed Sept. 1, 1955  4 Sheets-Sheet 4

Benjamin E. Luboshez
INVENTOR.
BY
ATTORNEY & AGENT

2,843,015

PRISM MAGNIFICATION SYSTEMS COMPRISING THREE OR MORE PRISMS

Benjamin E. Luboshez, Rochester, N. Y., assignor to Eastman Kodak Company, Rochester, N. Y., a corporation of New Jersey Application September 1, 1955, Serial No. 531,884

6 Claims. (Cl. 88—57)

This invention relates to optical prismatic magnification systems, and its object is to provide a system of prisms which magnifies the size of an object viewed through it in one direction and makes the object appear smaller when viewed through it in the reverse direction.

Other objects of the invention are to provide a magnifying or minifying attachment for objective lenses such as photographic or telescope objectives and more complex optical systems.

Anamorphotic prism systems are known in which two, three or four refracting prisms are mounted with a common active plane and tilted so as to magnify an image in the direction of the active plane while leaving it unchanged in size in the plane transverse thereto. In my copending application Serial No. 453,092, filed August 30, 1954, I have described telescopic magnification systems comprising two such anamorphosers with their active planes crossing each other at right angles so as to magnify the image in all directions. In two further copending applications, Serial Nos. 498,167 and 498,168, both filed March 31, 1955, now Patents Nos. 2,780,140 and 2,780,141, respectively, and both dated February 5, 1957, I have described means for correcting any deviation of the axis or any chromatic variation in the deviation of the axis in prismatic systems.

According to one form of the present invention, a prismatic magnifying system is made up in which three refracting prisms are arranged in optical alignment with each other and positioned at angles of approximately 120° to each other around the axis whereby the deviation and most of the aberrations due to any one of the prisms are annulled by the vectorially combined effect of the other two, and at the same time the magnifications of all three prisms are vectorially added so as to give the same magnification in all directions in the image plane.

According to a second form of my invention a prismatic magnifying system is made up comprising three prism anamorphosers arranged at angles of approximately 120° to each other around the optical axis, each anamorphoser comprising two or more prisms.

In this specification and the appended claims, a prismatic anamorphoser is taken to mean either a single prism tilted so as to magnify the image anamorphotically or two or more prisms with a common active plane tilted so as to augment each other's magnifying power and to substantially annul each other's deviation and unilateral color.

According to a more general form of the invention, a prismatic magnifying system is made up in which $x$ prism anamorphosers, where $x$ is an integer between 3 and 8 inclusive, are arranged in optical alignment and positioned at angles of approximately $(360°/x)$ to each other around the axis progressively in the same direction. In the case in which $x=4$, this differs from my earlier invention referred to above in that the prisms are arranged in a different order.

I have discovered that three prisms arranged approximately symmetrically around the axis in this manner produce a magnified or minified image which is surprisingly free from all optical aberrations including distortion and compares favorably with a four-prism system in this respect, and at the same time it has the advantages of a reduction in over-all length, in weight and in cost, as well as a gain in light transmission. For small magnifications, three prisms give highly satisfactory results. For larger magnifications, three pairs of prisms may be employed, as in the second form of the invention, or more than three prisms are used in accordance with the more general form of the invention.

The prisms have been described above as being optically aligned. It will be noted that the optical axis is deviated by each prism so that the next prism when tilted to make the same angle with the optical axis is tilted differently with respect to a fixed coordinate system than is the first prism. In this way each prism contributes a predetermined amount of deviation, magnification and unilateral chromatic aberration in its active plane, with the final result that all aberrational components substantially cancel each other in all planes around the optic axis while the prism magnifications augment each other.

This invention is not limited to the case in which all the prisms are identical in shape and optical properties nor to the case in which the prisms are oriented at exactly $(360°/x)$ apart around the axis, as I find it very advantageous to use variations in these parameters as a means for controlling the small residual aberrations. In particular, I use different prism angles and glasses of different dispersive indices in the different prisms for correcting axial deviation and unilateral color in a manner analogous to that described in my copending case, Serial No. 498,168, mentioned above.

The invention will be described in greater detail with reference to the accompanying drawings, in which.

Figures 1, 2:
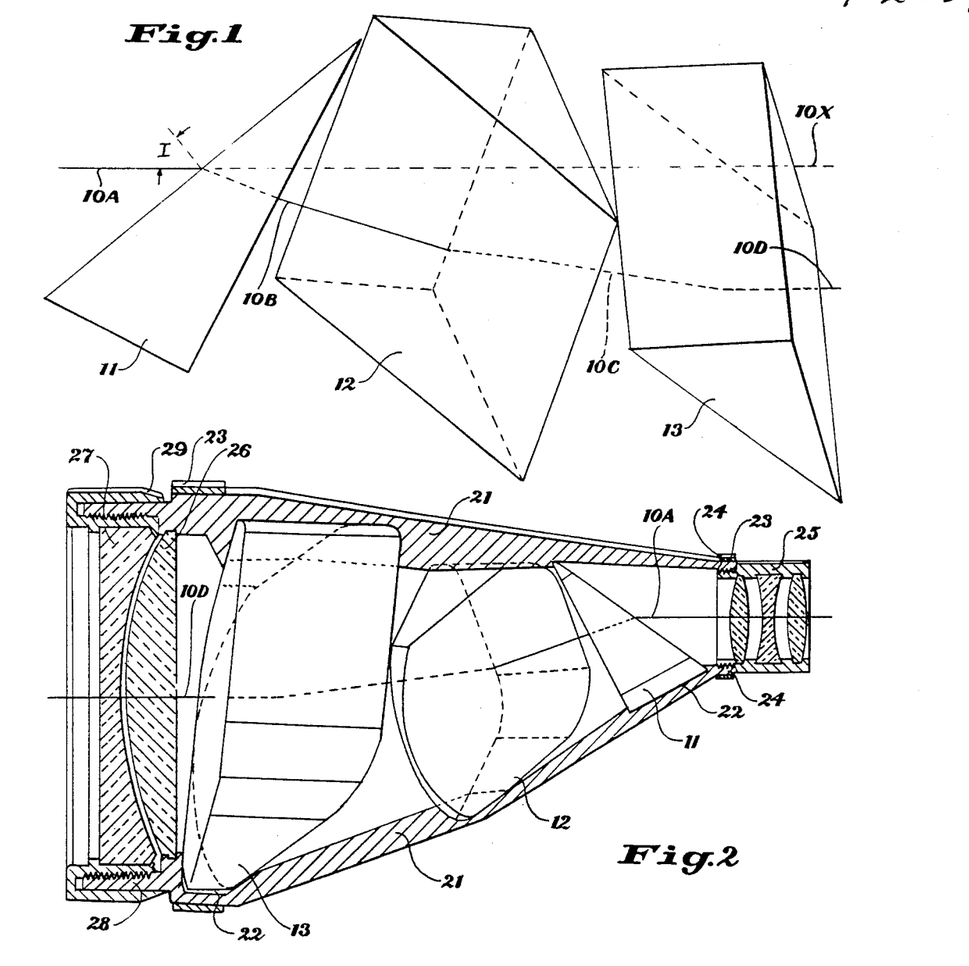
Fig. 1 is a side view of a prism system according to one form of the invention.
Fig. 2 is a prism system according to the invention made up as a magnifying (or telephoto) attachment for a camera objective.

Fig. 1 is a side view of a prism system according to one form of the invention. The system comprises three prisms 11, 12 and 13 optically aligned on an axis 10A—10B—10C—10D. The front prism 11 is positioned with its active plane in the plane of the diagram which for the sake of definiteness is taken as the vertical plane. The second prism is positioned with the optical axis segment 10B making approximately the same angle of incidence I on its front surface as segment 10A makes on the front surface of prism 11. If we imagine prism 12 as being free to turn about segment 10B as an axis of rotation, a rotation of about 120° (counterclockwise as viewed from the front) would bring it into the same plane as prism 11 with both bases down, or a rotation of about 60° in the opposite direction would bring it into direct opposition to prism 11 in the manner of known anamorphosers. Positioned as shown, however, the second prism 12 bends the axis obliquely, there being an upward component of bending bringing the next axis segment 10C about halfway back to the horizontal direction and a horizontal component of bending directing the segment 10C behind the plane of the diagram. The third prism 13 is likewise positioned so that the optical axis segment 10C makes approximately the same angle of incidence I on its front surface and so that if it were rotated 60° clockwise about segment 10C it would be opposite to prism 12 in the manner of known anamorphosers. This rotation of the prisms does not actually take place but is used in this description as a device for describing the positions of the prisms. The third prism also bends the axis obliquely but in such a way that the vertical component of bending adds onto that of the second prism and the horizontal component is opposite to that of the second prism so that the emerging axis segment 10D is below and substantially parallel to the extension 10X of the entering axis and behind the plane of the diagram.

In brief, the prisms are progressively at about 120° from each other around the optical axis. Since three angles of 120° total 360°, this should bring the third prism to a position of —120° about the axis 10D relative to the first prism. These relative rotations are around oblique axes, however, and the component of rotation about line 10A—10X is generally different from 120°, hence the angle between prisms 13 and 11 is generally somewhat different from 120° in this form of the invention. The exact amount of this deviation can be determined by standard formulae of spherical trigonometry.

Fig. 2 shows a prism system according to the invention made up as a magnifying or telephoto attachment for a camera objective. The prisms 11, 12, 13 are shown in substantially the same view as Fig. 1 except that the prism system is reversed end for end and that the prisms are tailored to the size of the conical light beam and rounded on the corners. The prisms are mounted in a generally conical mount 21 which is conveniently made up as two dissimilar halves (of which only one is shown) which are held together by collars 23. These halves are preferably die cast of metal or molded of plastic.

Careful workmanship is required to make the original molds, and gaps 22 are left where necessary to eliminate overhang and so permit the two parts of the mold for each half of the mount to be pulled apart. The faces which support the prisms may be spray coated with crepe rubber or covered with a layer of felt, if desired, to decrease breakage in case of being dropped.

At the rear end of the mount a threaded projection 24 is provided for screwing onto the front of a standard objective 25 which is shown somewhat schematically. At the front end a focusing lens system 26, 27 is provided comprising a fixed positive lens 26 and an axially movable negative lens 27. The negative lens is movable for focusing by turning relative to the threaded extension 28 of the barrel 21, and a focusing scale is provided at 29.

In order that the two threaded projectors 24, 28 may each be molded in two equal semi-circular halves, the main part of the mount 21 is divided into two halves on a plane which is common to the two ends 10A and 10D of the optical axis. This is at somewhat of an angle to the plane of the drawing, and so a part of the outside surface of the barrel is visible along the upper edge of the drawing.

The prisms are shown in full view and the other parts of the system are shown as sectioned on the plane just mentioned. It is to be pointed out, however, that if the conical mount 21 is made up in two halves then the surface thereof shown as sectional is an actual surface. The sectional shading is believed, however, to clarify the drawing. The sectional shading on the lens 25, the retaining bands 23 and the focusing system 26, 27, of course, show actual sections in the conventional way.

*Numerical examples.*—Data for two specific examples are given in the tables below for three-prism systems. These systems are color-corrected at the axis, that is the angular deviation of the axis varies extremely little with the wavelength of the light. They have been computed according to the mathematical theory outlined in a later section of this specification.

In these tables, the prisms are numbered in the first column as from front to rear in Fig. 1 or from rear to front in Fig. 2. The refractive indices N for the D spectral line and the conventional dispersive indices V are given in the next two columns. The angle of incidence I at the front surface and the angle of refraction I' at the rear surface of each prism is given in the fourth and fifth columns for the ray coinciding with the axis and traversing the system in the direction of minification as in Fig. 1. Finally the vertex angle A and the axial deviation D for each prism are given in the last two columns.

EXAMPLE 1, FIGS. 1 AND 2

| Prism | N | V | I | I' | A | D |
|---|---|---|---|---|---|---|
| | | | Degrees | Degrees | Degrees | Degrees |
| 11 | 1.5955 | 39.7 | 55.786 | 12.149 | 23.637 | 20.000 |
| 12 | 1.6072 | 49.2 | 55.713 | 12.542 | 23.170 | 20.000 |
| 13 | 1.6072 | 59.5 | 55.713 | 12.542 | 23.170 | 20.000 |

In Example 1 the anamorphotic magnification for each prism is 1.50, and the deviation D by each prism is 20°. The three glasses are DF 4 from Bausch and Lomb, and BaF–5 and SK–7 from Schott. They were selected so as to have refractive indices that are roughly equal and dispersive indices roughly in proportion to 1.0, 1.225 and 1.50 as called for by the theory developed in a later part of this specification. No significance is attached to the equality of the indices except that it shortens the design time somewhat.

There is an advantage in having a high refractive index, however, in that it makes for a thinner prism, and higher indices were used in the second example, which is as follows:

EXAMPLE 2, FIGS. 1 AND 2

| Prism | N | V | I | I' | A | D |
|---|---|---|---|---|---|---|
| | | | Degrees | Degrees | Degrees | Degrees |
| 11 | 1.6513 | 33.8 | 58.213 | 27.964 | 14.452 | 15.799 |
| 12 | 1.8037 | 41.8 | 58.206 | 30.772 | 11.636 | 15.799 |
| 13 | 1.7340 | 51.0 | 58.183 | 29.581 | 12.786 | 15.799 |

In Example 2 the anamorphotic magnification of each prism is 1.50 and the deviation D by each prism is 15.799°. This deviation was selected as a special case in which the directional vectors of the three segments of the axis determine an equilateral spherical triangle. The glasses used for making up the prisms are SF–9 from Schott and EK–450 and EK–210 made by the Eastman Kodak Co.

Prism systems having other degrees of magnification are readily designed in the same way. I find it advantageous to select three glasses whose dispersive indices are in the proportions of $1:\sqrt{M}:M$ where M is the anamorphic magnification per prism and to use the magnification of the more steeply inclined face as an independent variable and vary it until each prism is designed giving the required magnification and deviation. The angles of incidence are found by the formulae $$\tan^2 I'_1 = \frac{1-M_1^2}{N^2-1}$$

and $$\tan^2 I_2 = \frac{M_2^2-1}{M_2^2(N^2-1)}$$

and from these the other angles are found by conventional formulae given in textbooks.

Slight residual deviation, if any, can be eliminated by choosing a slightly different axis through the system, and residual unilateral color can be corrected by giving the prism in the direction of whose active plane the color aberration occurs a slightly larger or smaller refracting angle A and adjusting the angles of position about the axis to close the vectorial triangle of deviations. That is, the three deviation vectors are made to define a spherical triangle which is not equilateral rather than an equilateral triangle as in Fig. 6.

Alternatively, the deviation and color are measured or computed and then corrected by a combined dispersion and deviation wedge described in my copending Serial No. 498,167, now Patent Number 2,780,140, dated February 5, 1957, already mentioned.

Figure 3:
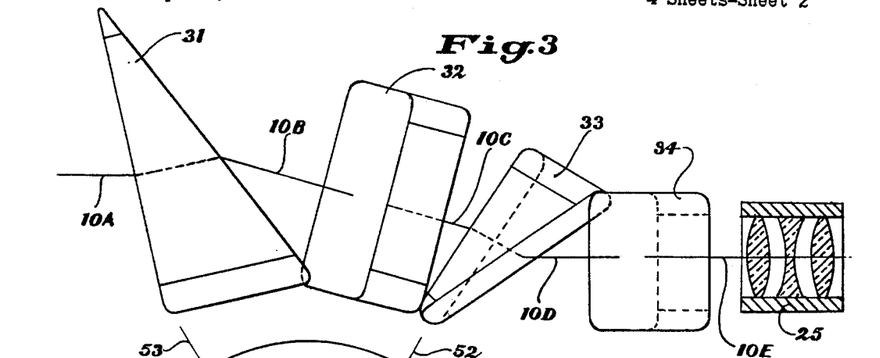
Fig. 3 is a side view of a prism system having four prisms.

Fig. 3 shows in diagrammatic side view a prismatic magnifying system according to the invention made up of four prisms 31, 32, 33, 34 aligned on an optical axis 10A—10B—10C—10D—10E, and each with its active plane at 90° around the axis relative to the next prism. The whole prism system is axially aligned with a conventional objective or optical system 25. A ray of light coinciding with the axis 10A entering the front of the system is bent downward in the plane of the diagram by the first prism 31, in a direction in front of the diagram by the second prism 32, toward the top of the diagram by the third prism 33 and back into a direction parallel with the plane of the diagram by the fourth prism 34. The emerging ray, coinciding with axis segment 10E, is in front of the plane in which the entering axis 10A lies. Prisms 31 and 33 are designed as the two prisms of an anamorphoser in accordance with known methods of design and likewise prisms 32 and 34. They are rearranged in sequence as compared with the system shown in my earlier application. This permits a shortening of the system by rounding the corners of the prisms, and this gain is compounded by the decrease in size which is then permissible in the front prisms 31, 32 and 33 while still passing the same cone of light, the smaller size permitting a still further shortening, and so on.

A greater number of prisms than four permits still more overlapping of prisms in those systems in which the prisms are tilted so as to have high angles of incidence of the axial ray at the surfaces of the prism.

It is to be pointed out that while systems in which the magnifications and deviations of all the individual prisms are equal are perhaps easier to design, the invention is not limited to that case, and prisms with considerably unequal magnifications and deviations can be used by adjusting their angular positions around the axis in accordance with the theory outlined below.

Theory of triple prism systems

The above is a full and complete description enabling those skilled in the art to practice the invention, and the following discussion is appended for those who are interested in the mathematical theory involved.

Figures 4, 5, 6:
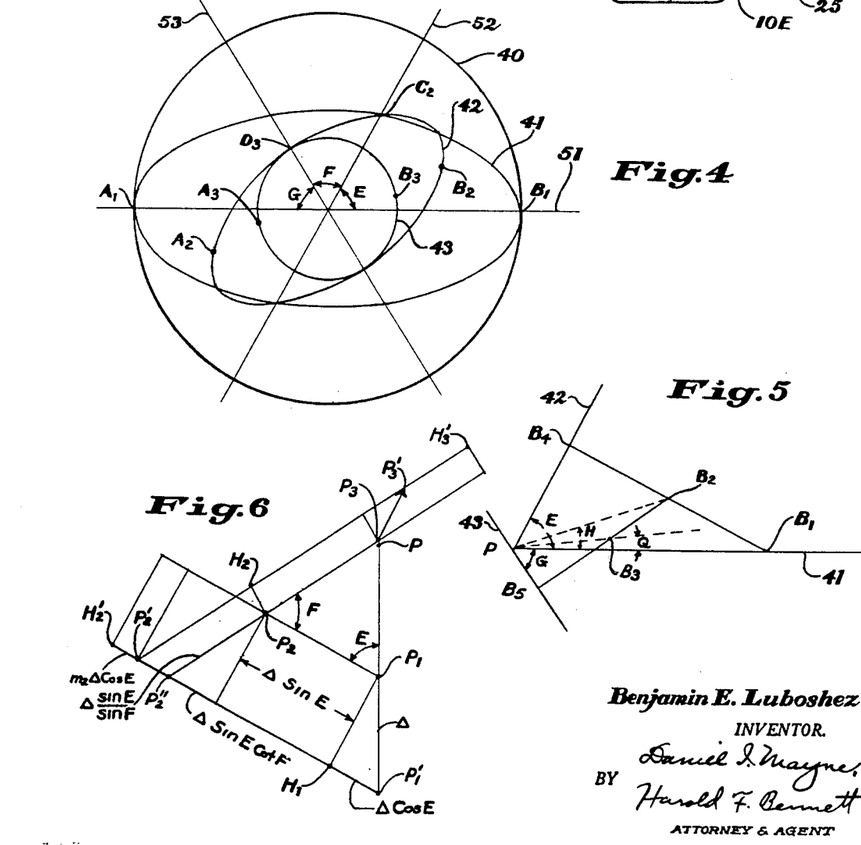
Fig. 4 is a mathematical diagram showing the effect of three anamorphotic compressions of an image.
Fig. 5 is a diagram showing the origin of the image rotation found in some types of prism systems.
Fig. 6 is a vectorial diagram showing how the deviations and dispersions of the several anamorphosers annul each other.

Fig. 4 is a mathematical diagram showing what happens to an image when it is anamorphically compressed successively in three different directions roughly 60° apart. A circle 40 is first compressed in a vertical direction toward the axis 51 to become the ellipse 41. This image is then compressed in the upper-left-lower right direction toward the axis 52 to become the ellipse 42. To restore the image to an undistorted circle, the direction of the third compression must be along the major axis of the second ellipse 42 and toward an axis 53 which lies along the minor axis of this ellipse, and the degree of compression is determined by the eccentricity of this ellipse. This final compression reduces the image to the circle 43.

The equations for the elippses 41, 42 are derived as follows: Assuming unit radius, the equation of the circle 40 is:

$$x^2+y^2=1$$

and taking the axis 51 as the $x$-axis, the equation of the ellipse 41 is $$x^2+\frac{y^2}{m_1^2}=1$$

Next, the coordinates are rotated through an angle E so that the axis 52 is the new $x$-axis. For this the standard transformation equations $$x=x_1 \cos E - y_1 \sin E$$
$$y=x_1 \sin E + y_1 \cos E$$

are used, in which $x_1$ and $y_1$ are the new coordinates. The equation of the ellipse 41 then becomes $$x_1^2\left(\cos^2 E + \frac{\sin^2 E}{m_1^2}\right) + 2x_1y_1 \cos E \sin E\left(\frac{1}{m_1^2}-1\right) +$$
$$y_1^2\left(\frac{\cos^2 E}{m_1^2}+\sin^2 E\right)=1$$

When this ellipse is compressed in the $y_1$ direction in the ratio $m_2$, it becomes ellipse 42, the equation of which is:

$$Ax_1^2+Bx_1y_1+Cy_1^2=1$$

where $$A=\cos^2 E + \frac{\sin^2 E}{m_1^2}$$

$$B=\frac{2}{m_2}\left(\frac{1}{m_1^2}-1\right)\cos E \sin E$$

and $$C=\frac{1}{m_2^2}\left(\frac{\cos^2 E}{m_1^2}+\sin^2 E\right)$$

Rotating coordinates through angle F so that axis 53 is the new $x$-axis and $x_2$, $y_2$ are the coordinates, the equation of the ellipse 42 becomes:

$$x_2^2(A\cos^2 F + B\cos F \sin F + C\sin^2 F)$$
$$+x_2y_2[-2A\cos F \sin F + B$$
$$(\cos^2 F - \sin^2 F) + 2C\cos F \sin F]$$
$$+y_2^2[A\sin^2 F - B\cos F \sin F + C\cos^2 F]=1$$

If the new coordinate axes are to coincide with the axes of the ellipse 32 then F must be chosen so that $x_2y_2$ term vanishes. This it does if $$B(\cos^2 F - \sin^2 F) = 2\cos F \sin F\ (A-C)$$

or:

$$\frac{2}{m_2}\left(\frac{1}{m_1^2}-1\right)\cos E \sin E\ (\cos^2 F - \sin^2 F) =$$

$$2\cos F \sin F\left[\left(\cos^2 E + \frac{\sin^2 E}{m_1^2}\right) - \left(\frac{\cos^2 E}{m_1^2 m_2^2}+\frac{\sin^2 E}{m_2^2}\right)\right]=$$

$$2\cos F \sin F\left[\left(1-\frac{1}{m_1^2 m_2^2}\right)\cos^2 E + \left(\frac{1}{m_1^2}-\frac{1}{m_2^2}\right)\sin^2 E\right]$$

This equation may be solved for F, giving:

$$\frac{2\cos F \sin F}{\cos^2 F - \sin^2 F}=\tan 2F =$$

$$\frac{m_2(1-m_1^2)\sin 2E}{(m_1^2 m_2^2-1)\cos^2 E + (m_2^2-m_1^2)\sin^2 E}$$

Certain special cases are of interest. First, if $m_2=m_1$ then $(m_2{}^2-m_1{}^2)=0$ and the equation reduces to $$\tan 2F = \frac{-2m_1}{m_1{}^2 1} \tan E$$

Second, if $F=E$ then $$\tan^2 E = \frac{m_2 - m_2 m_1{}^2 - m_1{}^2 m_2{}^2 + 1}{m_2{}^2 - m_1{}^2 + m_2 - m_1{}^2 m_2}$$

And third, if both conditions hold, i. e. $m_2=m_1$ and $F=E$ then $$\cos^2 E = \frac{m}{(m+1)^2}$$

The magnification $m_3$ by the third prism which is required to image the ellipse 42 as a circle 43 is the ratio of the coefficients of $y_2{}^2$ and $x_2{}^2$ in the equation of ellipse 42. This magnification can be computed numerically in the general case, and in the last-mentioned special case it turns out that $m_3=m_1$ also, and that the overall magnification is $m^{3/2}$.

The image formed by prism systems according to the invention is remarkably free of distortion, although a priori one might have expected a trilateral flattening. There is a rotation of the image in its own plane, however, as shown by the imaging of point $A_1$ first at point $A_2$ and then at point $A_3$ below the axis and point $B_1$ at points $B_2$ and $B_3$ above the axis.

Fig. 5 is a diagram aiding in determining the angle Q of this image rotation. The axes 41, 42 and 43, the points $B_1$, $B_2$ and $B_3$, and the angles E, F and G are as defined in Fig. 4. Considering the angles about the pole P, $$\tan E = \frac{B_1 B_4}{B_4 P}$$

and $$\tan (E-H) = \frac{B_2 B_4}{B_4 P} = m_2 \tan E$$

Similarly $$\tan (G+H) = \frac{B_2 B_5}{B_5 P}$$

and $$\tan (G+Q) = \frac{B_3 B_5}{B_5 P} = m_3 \tan (G+H)$$

In numerical examples, the last angle may be looked up in a table of tangents and G subtracted therefrom to find Q, the angle of image rotation.

In the special case mentioned above in which $m_3=m_2=m_1$ and $F=E$ it can be shown that $(G+Q)=E$ or $Q=3(E-60°)$, Q being the angular rotation of the image as previously defined.

The following table gives data for a series of examples from $m=1$ to the theoretical limit $m=0$. Magnifications from $m=1$ to $m=\infty$ are represented by the same systems but with the light traversing them in the reverse direction.

| E | Q | m | $m^{3/2}$ |
|---|---|---|---|
| Degrees | Degrees | | |
| 60 | 0 | 1 | 1 |
| 60.667 | 2.000 | 0.66667 | 0.5443 |
| 61.874 | 5.623 | 0.5 | 0.3536 |
| 65 | 15 | .3034 | .1672 |
| 70 | 30 | .1564 | .0619 |
| 80 | 60 | .0321 | .0058 |
| 90 | 90 | 0 | 0 |

The most useful range of $m$ is from about 0.96 to about 0.5.

It is interesting to investigate whether some combination of the magnifications $m_1$, $m_2$ and $m_3$ and angles E, F and G exists for which the image is not rotated, i. e. Q is zero. The condition for this may be written:

$$\tan^{-1} \frac{\tan G}{m_3} - G = E - \tan^{-1}(m_2 \tan E)$$

By means of diagrams similar to Fig 5 for point $C_2$ at which ellipses 41 and 42 intersect on axis 52 and for point $D_3$ at which ellipse 42 and circle 43 intersect axis 53, it is found that the following conditions are also necessary for zero image rotation:

$$\tan^{-1} \frac{\tan E}{m_1} - E = F - \tan^{-1}(m_3 \tan F)$$

and $$\tan^{-1} \frac{\tan F}{m_2} - F = G - \tan^{-1}(m_1 \tan G)$$

It can be shown that there is no non-trivial simultaneous solution for these three equations and hence that it is impossible to eliminate image rotation under the assumed conditions, i. e. with three straight-vision anamorphosers.

There is another set of conditions, however, in which the individual anamorphosers have deviations, and in this case it is possible to choose a deviation such that the directional vectors of the axis segments 10A, 10B, 10C, and 10D of Fig. 1 determine the vertices of an equilateral spherical triangle in which the angles are equal to E as defined above. Example 2, already described, is a specific example of this case. This system should have no image rotation.

The axis of a system of this type can always be located, at least theoretically, if the magnification is not unity. This can be demonstrated in the following way: Assume that the light rays go in the direction in which the magnification is greater than unity. The rays from the lowest object point are bent upward and those from the highest object point downward. An analogous pattern also holds in the horizontal plane. Somewhere, then, there must be a ray which is not deviated, and this is the axis of the system. This axis may pass through the prisms apertures closer to one margin than the other, but the deviation of each prism can be adjusted independently of the magnification, at least during the design of a system, and the axis can be made to pass as close as desired to the center of the aperture.

Unilateral color is an aberration defined in my earlier applications, in which a ray of white light entering the system along the axis is spread out into a spectrum upon emergence.

Fig. 6 is a diagram to aid in explaining the origin of unilateral color in triple systems and leading to a method of eliminating it. The diagram shows the angular deviation of a ray in cartesian coordinates. An entering ray is aimed at the pole P and light of one wavelength (called the normal wavelength) is deviated downward to the direction $P_1$ by the first prism or prism system. Light of a different wavelength is deviated further to a direction $P_1'$, the difference in direction being called the dispersion and designated as $\Delta$. For systems consisting of three single prisms $\Delta$ is exaggerated on the order of 50 times in the diagram for clarity, but in systems consisting of three two-prism anamorphosers, it is possible for $\Delta$ to be as large as the deviation.

The second prism or prism system is at an angle E to the first and for the moment is assumed to have the same deviation and dispersion as the first. The ray in the normal wavelength is then deviated from the direction $P_1$ to the direction $P_2$ and the ray in the other wavelength is deviated from the direction $P_1'$ to the direction $P_2'$. The latter deviation is determined as follows: A ray in the auxiliary wavelength aimed in the direction $H_1$ would be deviated to direction $H_2'$, the same deviation as in the first prism system. The angular interval between $H_1$ and $P_1'$, however, is changed by the magnification of the second prism to the interval $H_2'P_2'$. In the diagram the magnification $m$ of each of the three prisms or prism systems is taken as 0.5 and angles E and F as 62°.

The third prism or prism system is at an angle F to the second and deviates the ray in the normal wavelength from the direction $P_2$ to the direction $P_3$ and the ray in the other wavelength from the direction $P_2'$ to $P_3'$. The latter deviation is determined in the same manner using points $H_2$ and $H_3'$ as in the case of the second prism.

It will be noted that this diagram is a planar representation of an area around the pole of a sphere and hence is somewhat distorted. As noted above, in some special cases the spherical triangle $PP_1P_2$ is closed and $P_3$ coincides with P. However, in some cases the final direction $P_3'$ as computed does not correspond to the original direction P, and this can easily be corrected by choosing a different ray as the axis or by redesigning the prisms with slightly different deviations, so that the changes in the deviations add vectorially to give the required change in final deviation.

The final unilateral color for the ray depicted in the diagram is shown by the arrow $P_3P_3'$. In this case it is about half the dispersion of one of the three prisms or prism systems.

The correction of unilateral color may be accomplished as follows. Designating the dispersion of the first prism as $\Delta$, $P_1H_1 = \Delta \sin E$, $P_1'H_1 = \Delta \cos E$, and $H_2'P_2' = m_2\Delta \cos E$. It will be seen that if the dispersion of the second prism is decreased (increased if $m_2 > 1$) to equal $$\Delta (m_2 \cos E + \sin E \cot F)$$

then the point $P_2'$ would be moved down to $P_2''$ lying in a straight line with $P_2$ and $P_3$. Noting that $P_2P_2'' = \Delta \sin E/\sin F$, it is clear that point $P_3'$ can be made to coincide with $P_3$ if the deviation of the third prism or prism system is made equal to $$m_3\Delta \sin E/\sin F$$

or simply $m\Delta$ if angles and magnifications are mutually equal.

In the specific system in which $$m = 0.5 \text{ and } E = F = 61.874°$$

the unilateral color can theoretically be corrected by making the dispersions $V_1$, $V_2$ and $V_3$ of the respective prisms as follows:

$$V_1 = 35.0$$
$$V_2 = 49.5$$
$$V_3 = 70.0$$

and making them the same in refractive index and angular dimensions. Since glasses of exactly the same refractive index are not usually commercially available, however, in practice it is necessary to adopt values that are only approximations and to redesign with the prism dimensions and prism magnifications somewhat modified. The changes in the dispersions of the individual prisms can be added vectorially in the same way as the deviations and thus one arrives directly at a closer approximation which will be within acceptable tolerances.

The design of individual prisms with predetermined magnification, deviation and dispersion is discussed at greater length in my earlier filed applications already mentioned.

Those skilled in the art will be readily able to apply the same principles to systems having 4, 5, 6, 7 or 8 prisms, each of which is positioned at approximately 90°, 72°, 60°, 51.4° or 45° respectively around the axis from the next prism in accordance with the more general form of the invention. This is illustrated below for a system of eight prisms.

Figures 7, 8, 9:
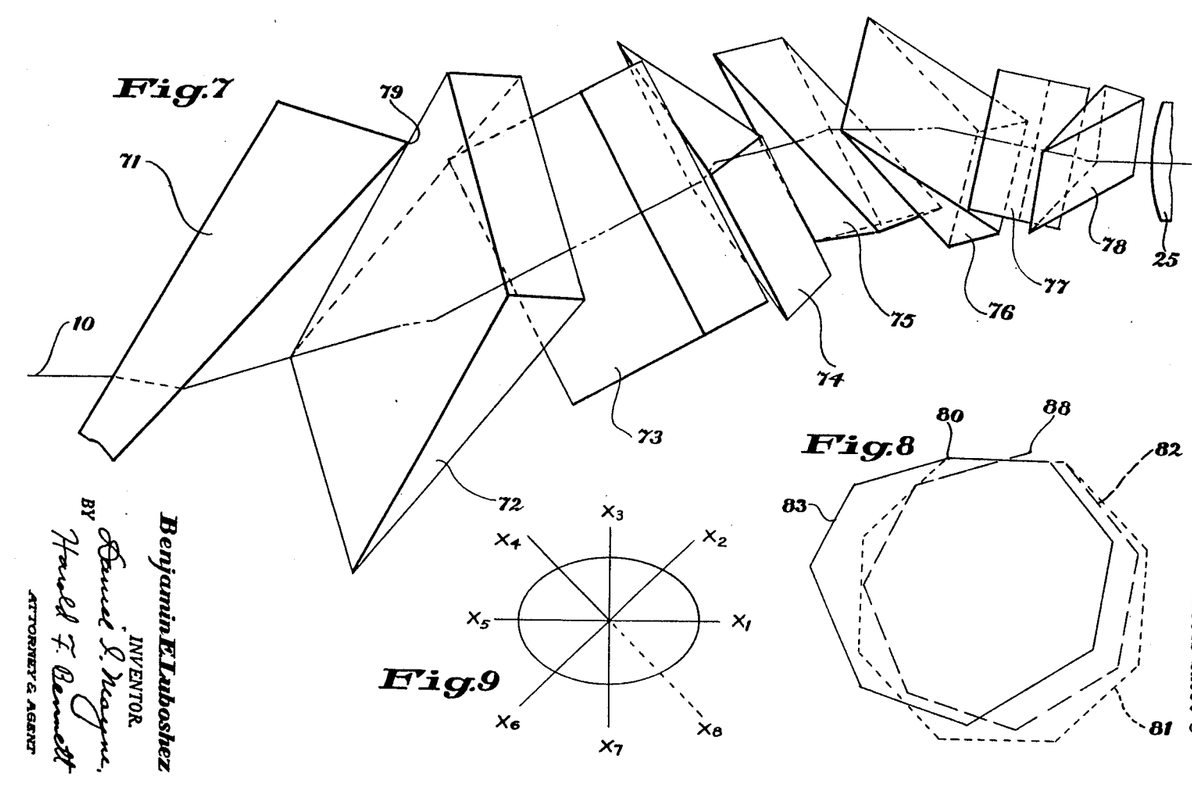
Fig. 7 is a side view of a prism system having eight prisms.
Fig. 8 is a vectorial diagram relating to the eight prism system.
Fig. 9 is a mathematical diagram used in deriving formulas for the eight prism system.

*System comprising eight prisms.*—Fig. 7 shows a prism system according to the invention operating as a telephoto attachment and comprising eight refracting prisms 71 to 78 optically aligned with a lens system 25 shown fragmentarily. For clarity the optical axis 10 is shown as a full line when in air and as a dotted line when in glass rather than in the standard way. I consider eight the maximum number of prisms that it is practical to use, although theoretically the number could be increased indefinitely. The overlapping of prisms along the length of the system, which has already been described, is clearly seen in this drawing, for example the second prism 72 overlaps the first prism 71 from point 79 at the heel of the first prism to the refracting edge of the second prism, including nearly four-fifths of the length along the front face thereof. As already explained, this overlapping shortens the system and permits using smaller prisms than possible with previously known prism systems in which most of the prisms in a system are arranged with the refracting edge of one against the heel of the next. In the eight prism system the angle E between the active plane of one prism and that of the next is approximately 360°/8 or 45°. This is a special angle for which the sine equals the cosine thus greatly simplifying the formulae given above and facilitating the design of systems. If more than eight prisms were used, there would be little more gain in the degree of overlapping of each prism with the next, and the gain therein would not make up for the increased thickness of the greater number of prisms. Besides this there are the added complications of computation with odd angles and of mounting prisms at odd angles, so that all in all the gain from dividing the required magnification among a greater number of prisms than eight is more than offset by the disadvantages involved.

*Deviation.*—Fig. 8 is analogous in part to Fig. 6 and is a diagram showing the effect of the deviation of the axis by each individual prism following the theory set forth in connection with Fig. 6. The diagram may be taken as a map of a portion of a large sphere with the prism system at the center thereof and viewed also from the center. The direction of the optical axis entering the system is represented by point 80, and each deviation of the axis to a new direction determines one of the line segments shown.

As in the three prism system, systems with more than three prisms are affected by the discrepancy between the angles of a plane polygon and those of the corresponding polygon on a sphere. If this were not true, or if the deviations were very small, the deviations of the axis by an eight prism system with each prism at 45° to the next would outline a regular octagon 81 shown dotted. Since it is true, however, equal deviations by eight prisms at 45° to each other produce an unclosed octagon 82 deviating progressively more and more from the regular octagon and ending with the axis in a new direction 88. As explained in connection with Fig. 6, this figure can be closed by lengthening some sides and shortening others, i. e. by varying the deviations of the prisms, as indicated by the irregular octagon 83, or optionally by varying the angles between the active planes of successive prisms or by both methods in conjunction with each other. Obviously, however, there are more variables (deviations, dispersions, magnifications and angles between successive active planes) to work with for designing straight-vision color corrected systems with no rotation of the image in systems with more than three prisms than in three prism systems.

Fig. 9 is a diagram aiding in the understanding of the following adaptation to an eight prism system of the formulae given above for the three prism system. Seven successive rotations of coordinates are made during the derivation, the eight sets of coordinate axes being represented by the positive half of the respective $x$ axes, $x_1$ to $x_8$, the last being shown dotted because it is more likely to be at an angle other than 45°.

Starting with a circle, not shown, as object, the first prism compresses the circle into an ellipse. The case illustrated is the case in which the figure is compressed along the $y$ axis, that is the magnification $m$ is less than unity, resulting in the ellipse shown, the equation of which is $$x_1^2 + \frac{y_1^2}{m^2} = 1$$

on the axes represented by $x_1$.

For rotating coordinates 45° to $x_2$, the standard transformation equations reduce to this simple form:

$$x_1 = (\sqrt{2}/2)(x_2 - y_2)$$
$$y_1 = (\sqrt{2}/2)(x_2 + y_2)$$

since $\sin 45° = \cos 45° = \sqrt{2}/2$.

As previously, each step consists of rotating the coordinates of the $n$th ellipse, which is of the form $$A_n x_n^2 + B_n x_n y_n + C_n y_n^2 = 1$$

to the $X_{n+1}$ axes and compressing it in the $Y_{n+1}$ direction by a magnification $m$ to get the equation of the $(n+1)$th ellipse, which is of the form:

$$A_{n+1} x_{n+1}^2 + B_{n+1} x_{n+1} y_{n+1} + C_{n+1} y_{n+1}^2 = 1$$

First, rotating the coordinates by 45°, the $n$th ellipse has the following equation on the $(n+1)$th axes:

$$1/2[A_n(x_{n+1} - y_{n+1})^2 + B_n(x_{n+1}^2 - y_{n+1}^2) + C_n(x_{n+1} + y_{n+1})^2]$$
$$= 1/2[(A_n + B_n + C_n)x_{n+1}^2 + (-2A_n + 2C_n)X_{n+1}Y_{n+1} + (A_n - B_n + C_n)Y_{n+1}^2] = 1$$

The flattening of the ellipse in the new direction is carried out by substituting $(y_{n+1}/m)$ for $y_{n+1}$. Hence for this case the transformation equations are $$A_{n+1} = 1/2(A_n + B_n + C_n)$$

$$B_{n+1} = \frac{1}{2m}(-2A_n + 2C_n)$$

and $$C_{n+1} = \frac{1}{2m^2}(A_n - B_n + C_n)$$

Each A, B, and C being a polynomial in powers of $1/m$.

It is convenient to carry out the series of transformations in tabular form as in the table below in which the powers of $$\frac{1}{m}$$

are at the tops of the respective columns. Multiplication by $1/m$ or $(1/m)^2$ is carried out by displacing a polynomial one or two places respectively to the right.

| Power of $\frac{1}{m}$ | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| $A_1$ | 1 | | | | | | | | | | | | | | | | |
| $C_1$ | | | 1 | | | | | | | | | | | | | | |
| $B_1$ | 0 | 0 | 0 | | | | | | | | | | | | | | |
| $-2A_1 \cdot \frac{1}{m}$ | | $-2$ | | | | | | | | | | | | | | | |
| $+2C_1 \cdot \frac{1}{m}$ | | | | $+2$ | | | | | | | | | | | | | |
| $2A_2$ | 1 | 0 | 1 | | | | | | | | | | | | | | |
| $2C_2$ | | | 1 | 0 | 1 | | | | | | | | | | | | |
| $2B_2$ | | $-2$ | 0 | $+2$ | | | | | | | | | | | | | |
| $-4A_2 \cdot \frac{1}{m}$ | | $-2$ | 0 | $-2$ | | | | | | | | | | | | | |
| $+4C_2 \cdot \frac{1}{m}$ | | | | $+2$ | 0 | $+2$ | | | | | | | | | | | |
| $4A_3$ | 1 | $-2$ | $+2$ | $+2$ | $+1$ | | | | | | | | | | | | |
| $4C_3$ | | | $+1$ | $+2$ | $+2$ | $-2$ | $+1$ | | | | | | | | | | |
| $4B_3$ | | $-2$ | 0 | 0 | 0 | $+2$ | | | | | | | | | | | |
| $-8A_3 \cdot \frac{1}{m}$ | | $-2$ | $+4$ | $-4$ | $-4$ | $-2$ | | | | | | | | | | | |
| $+8C_3 \cdot \frac{1}{m}$ | | | | $+2$ | $+4$ | $+4$ | $-4$ | $+2$ | | | | | | | | | |
| $8A_4$ | 1 | $-4$ | $+3$ | $+4$ | $+3$ | 0 | $+1$ | | | | | | | | | | |
| $8C_4$ | | | $+1$ | 0 | $+3$ | $+4$ | $+3$ | $-4$ | $+1$ | | | | | | | | |
| $8B_4$ | | $-2$ | $+4$ | $-2$ | 0 | $+2$ | $-4$ | $+2$ | | | | | | | | | |
| $-16A_4 \cdot \frac{1}{m}$ | | $-2$ | $+8$ | $-6$ | $-8$ | $-6$ | 0 | $-2$ | | | | | | | | | |
| $+16C_4 \cdot \frac{1}{m}$ | | | | $+2$ | 0 | $+6$ | $+8$ | $+6$ | $-8$ | $+2$ | | | | | | | |
| $16A_5$ | 1 | $-6$ | $+8$ | $+2$ | $+6$ | $+6$ | 0 | $-2$ | $+1$ | | | | | | | | |
| $16C_5$ | | | $+1$ | $-2$ | 0 | $+6$ | $+8$ | $+6$ | $-6$ | $+1$ | | | | | | | |
| $16B_5$ | | $-2$ | $+8$ | $-4$ | $-8$ | 0 | $+8$ | $+4$ | $-8$ | $+2$ | | | | | | | |
| $-32A_5 \cdot \frac{1}{m}$ | | $-2$ | $+12$ | $-16$ | $-4$ | $-12$ | $-12$ | 0 | $+4$ | $-2$ | | | | | | | |
| $+32C_5 \cdot \frac{1}{m}$ | | | | $+2$ | $-4$ | 0 | $+12$ | $+12$ | $+4$ | $+16$ | $-12$ | $+2$ | | | | | |
| $32A_6$ | 1 | $-8$ | $+17$ | $-4$ | $-2$ | $+12$ | $+14$ | $+4$ | $+1$ | $-4$ | $+1$ | | | | | | |
| $32C_6$ | | | $+1$ | $-4$ | $+1$ | $+4$ | $+14$ | $+12$ | $-2$ | $-4$ | $+17$ | $-8$ | $+1$ | | | | |
| $32B_6$ | | $-2$ | $+12$ | $-14$ | $-8$ | $-12$ | 0 | $+12$ | $+8$ | $+14$ | $-12$ | $+2$ | | | | | |
| $-64A_6 \cdot \frac{1}{m}$ | | $-2$ | $+16$ | $-34$ | $+8$ | $+4$ | $-24$ | $-28$ | $-8$ | $-2$ | $+8$ | $-2$ | | | | | |
| $+64C_6 \cdot \frac{1}{m}$ | | | | $+2$ | $-8$ | $+2$ | $+8$ | $+28$ | $+24$ | $-4$ | $-8$ | $+34$ | $-16$ | $+2$ | | | |
| $64A_7$ | 1 | $-10$ | $+30$ | $-22$ | $-9$ | $+4$ | $+28$ | $+28$ | $+6$ | $+6$ | $-6$ | $+1$ | | | | | |
| $64C_7$ | | | $+1$ | $-6$ | $+6$ | $+6$ | $+7$ | $+28$ | $+28$ | $-9$ | $-22$ | $+30$ | $-10$ | $+1$ | | | |
| $64B_7$ | | $-2$ | $+16$ | $-32$ | 0 | $+6$ | $-16$ | 0 | $+16$ | $-6$ | 0 | $+32$ | $-16$ | $+2$ | | | |
| $-128A_7 \cdot \frac{1}{m}$ | | $-2$ | $+20$ | $-60$ | $+44$ | $+18$ | $-8$ | $-56$ | $-56$ | $-14$ | $-12$ | $-12$ | $+12$ | $-2$ | | | |
| $+128C_7 \cdot \frac{1}{m}$ | | | | $+2$ | $-12$ | $+12$ | $+12$ | $+14$ | $+56$ | $+56$ | $+8$ | $-18$ | $-44$ | $+60$ | $-20$ | $+2$ | |
| $128A_8$ | 1 | $-12$ | $+47$ | $-60$ | $-3$ | $+16$ | $+19$ | $+56$ | $+51$ | $+4$ | $-3$ | $+4$ | $+15$ | $-8$ | $+1$ | | |
| $128C_8$ | | | $+1$ | $-8$ | $+15$ | $+4$ | $-3$ | $+4$ | $+51$ | $+56$ | $+19$ | $+16$ | $-3$ | $-60$ | $+47$ | $-12$ | $+1$ |
| $128B_8$ | | $-2$ | $+20$ | $-58$ | $+32$ | $+30$ | $+4$ | $-42$ | 0 | $+42$ | $-4$ | $-30$ | $-32$ | $+58$ | $-20$ | $+2$ | |

By way of example, a magnification of 1/1.4 per prism and an angle E of 45° between each prism and the next gives an ellipse $$15.2785 X_8^2 + 1.2826 X_8 Y_8 + 14.2747 Y_8^2 = 1$$

Rotating coordinates by 25.976° as found by the standard formula $$\tfrac{1}{2} \tan^{-1} \frac{B}{A-C}$$

gives the simplified equation $$15.5909 X^2 + 13.9622 Y^2 = 1$$

showing that an added magnification of 0.9463 would be needed to produce a circle with a total magnification of 1/3.94.

I prefer, however, as in the three prism system, to determine the penultimate ellipse, which is $$10.82656 X_7^2 + 8.00328 X_7 Y_7 + 11.74272 Y_7^2 = 1$$

and the required angle of rotation 48.265° which determines the exact direction of the $X_8$ axis. This ellipse is then $$15.31241 X_8^2 + 7.25686 Y_8^2 = 1$$

and a magnification of 0.68842 by the last prism gives a circle as a final image and a total magnification of 1/3.913 for the system.

Figures 10, 11:
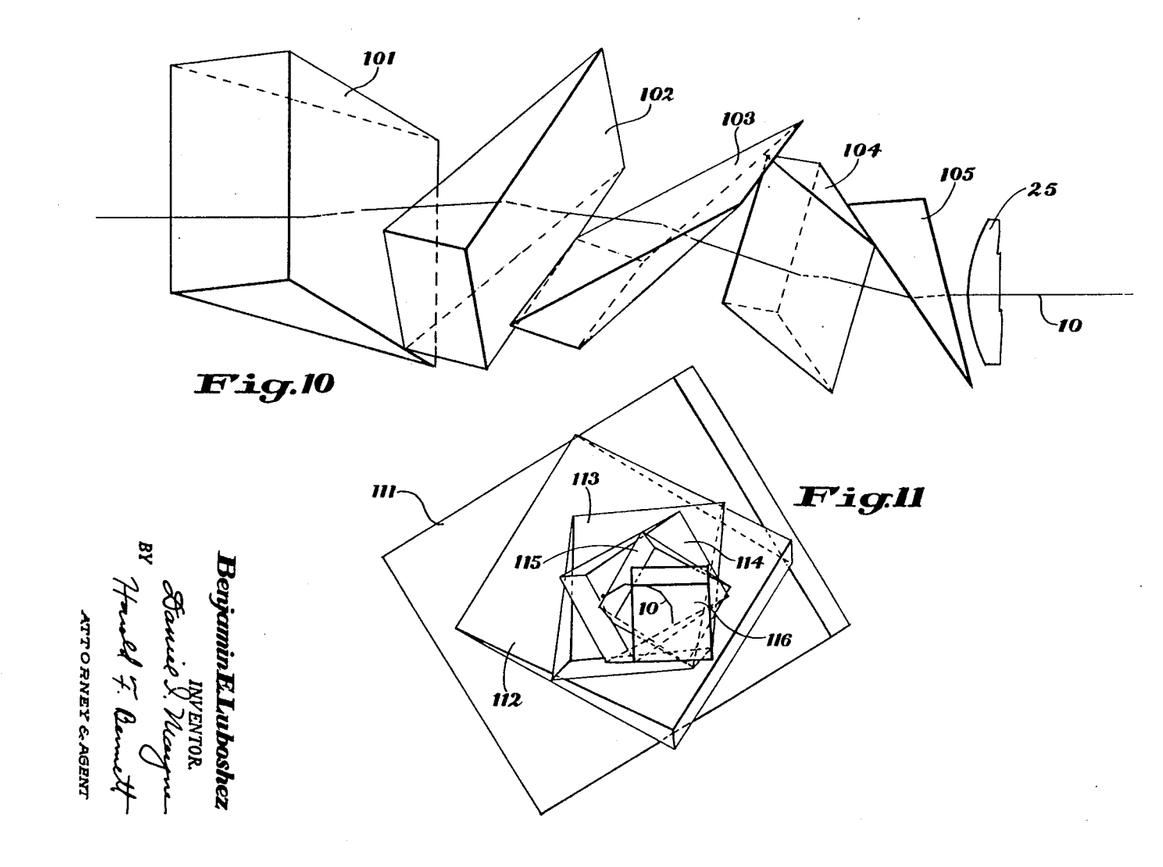
Fig. 10 is a side view of a five prism system.
Fig. 11 is a rear end view of a six prism system.

Fig. 10 shows a five prism system made up of prisms 101 to 105 aligned on an optical axis 10 with a lens system 25 shown fragmentarily. Since the less steeply slanted side of each prism is toward the lens as in Fig. 1, this system operates as a wide angle attachment.

Fig. 11 shows a six prism telephoto attachment comprising prisms 111 to 116 optically aligned on axis 10 and viewed from behind the lens position with the lens removed.

The seven prism system (not shown) is intermediate between the six prism system of Fig. 11 and the eight prism system of Fig. 7.

The five, six and seven prism systems are computed by repeated application of the rotational and flattening transformations described in the theory of triple prism systems. It is usually easier in these cases to compute each transformation numerically rather than to work out general formulas.

I claim:

1. An anamorphotic prism system optically aligned along an optical axis and comprising a plurality of $x$ anamorphosing prisms, where $x$ is an integer between 3 and 8 inclusive, arranged in approximately symmetrical orientation at different angular positions around the optical axis in such manner that the angle between the active planes of each two succeeding anamorphosing prisms is chosen to be approximately $360°/x$ and further is so chosen relative to the magnification of each anamorphosing prism that the final magnification of the image is substantially equal in all directions in the image plane, whereby all the aberrational components substantially cancel each other in all planes around the optical axis while the prism magnifications augment each other.

2. An anamorphotic prism magnifying system according to claim 1 in which the number $x$ of anamorphosing prisms is three and the angle F between the second and third prisms is related to the angle E between the first and second by the following equation $$\tan 2F = \frac{m_2(1 - m_1^2) \sin 2E}{(m_1^2 m_2^2 - 1) \cos^2 E + (m_2^2 - m_1^2) \sin^2 E}$$

where $m_1$ and $m_2$ are the anamorphotic magnifications of the first and second prisms, respectively.

3. An anamorphotic prism magnifying system according to claim 2 in which the deviations of the individual prisms correspond to the sides of a spherical triangle of which E and F are two of the angles.

4. An anamorphotic prism magnifying system according to claim 1 in which the number $x$ of prisms is at most four.

5. An anamorphotic prism magnifying system according to claim 1 in which the number $x$ of prisms is four, and in which the chromatic dispersion of the third prism is approximately $m_3$ times that of the first and that of the fourth prism is approximately $m_4$ times that of the second, where $m_3$ and $m_4$ are the anamorphotic magnifications of the third and fourth prisms respectively.

6. An anamorphotic prism magnifying system according to claim 1 in combination with and in axial alignment in front of an objective lens system.

References Cited in the file of this patent

UNITED STATES PATENTS

| | | |
|---|---|---|
| 1,647,631 | Ives | Nov. 1, 1927 |
| 1,898,787 | Newcomer | Feb. 21, 1933 |
| 1,905,442 | Coors | Apr. 25, 1933 |
| 1,931,992 | Newcomer | Oct. 24, 1933 |
| 1,932,082 | Newcomer | Oct. 24, 1933 |
| 2,023,217 | Benford | Dec. 3, 1935 |
| 2,048,284 | Newcomer | July 21, 1936 |
| 2,088,660 | Newcomer | Aug. 3, 1937 |
| 2,375,634 | Dunning | May 8, 1945 |

FOREIGN PATENTS

| | | |
|---|---|---|
| 250,784 | Germany | Sept. 18, 1912 |